United States Patent
Mendez et al.

(10) Patent No.: US 8,034,210 B2
(45) Date of Patent: Oct. 11, 2011

(54) APPARATUS AND METHOD FOR AUTOMATICALLY FABRICATING TAPE WITH THREADS FOR VISUALIZATION OF AIR STREAMS ON AERODYNAMIC SURFACES

(75) Inventors: Eva Marie Montilla Mendez, Borgfeld (DE); Susanne Wyrembek, Delmenhorst (DE); Tim Moenning, Bremen (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 12/794,189

(22) Filed: Jun. 4, 2010

(65) Prior Publication Data
US 2010/0236704 A1   Sep. 23, 2010

Related U.S. Application Data

(60) Division of application No. 11/364,775, filed on Feb. 28, 2006, now Pat. No. 7,730,922, which is a continuation of application No. PCT/EP2004/009584, filed on Aug. 27, 2004.

(30) Foreign Application Priority Data

Aug. 29, 2003  (DE) .................................. 103 40 259

(51) Int. Cl.
*B32B 37/02*  (2006.01)
*B32B 38/04*  (2006.01)

(52) U.S. Cl. ........ 156/265; 156/250; 156/256; 156/264; 156/510; 156/517; 901/14; 901/15; 901/31; 901/32

(58) Field of Classification Search .................. 156/250, 156/256, 263, 297, 302, 510, 517, 519, 522, 156/560, 264, 265, 299; 73/147; 901/14, 901/15, 31, 32
See application file for complete search history.

(56) References Cited

U.S. PATENT DOCUMENTS

| | | | |
|---|---|---|---|
| 1,211,848 A | 1/1917 | Howard | |
| 1,383,243 A | 6/1921 | Schwartz | |
| 3,980,177 A | 9/1976 | McGregor | |
| 4,178,632 A | 12/1979 | Anthony | |
| 4,410,382 A | 10/1983 | Varela | |
| 4,567,760 A | 2/1986 | Crowder | |
| 4,717,304 A | 1/1988 | Bocchicchio et al. | |
| 4,919,739 A | 4/1990 | Dyksterhouse et al. | |
| 4,922,904 A | 5/1990 | Uetake et al. | |
| 5,127,264 A | 7/1992 | Schmalz | |
| 5,418,257 A * | 5/1995 | Weisman | .................. 521/54 |

(Continued)

FOREIGN PATENT DOCUMENTS

DE   102004041843 A1   9/2005

(Continued)

OTHER PUBLICATIONS

Office Actioni from U.S. Appl. No. 12/253,028, dated Apr. 1, 2009.

(Continued)

*Primary Examiner* — Mark A Osele
*Assistant Examiner* — Christopher C Caillouet
(74) *Attorney, Agent, or Firm* — Lerner, David, Littenberg, Krumholz & Mentlik, LLP

(57) ABSTRACT

Apparatus and method for visualizing air stream by little threads on aerodynamic surfaces such that strips of adhesive tape populated with threads are automatically fabricated.

6 Claims, 9 Drawing Sheets

U.S. PATENT DOCUMENTS

| | | | |
|---|---|---|---|
| 5,469,996 | A | 11/1995 | Hurlimann |
| 6,038,949 | A | 3/2000 | Jander |
| 7,730,922 | B2 | 6/2010 | Mendez et al. |
| 2005/0175379 | A1 | 8/2005 | Berg et al. |
| 2009/0032182 | A1 | 2/2009 | Montilla et al. |

FOREIGN PATENT DOCUMENTS

| | | |
|---|---|---|
| GB | 1344462 A | 1/1974 |
| GB | 2235176 A | 2/1991 |
| GB | 2303613 A | 2/1997 |
| WO | 97/44674 A1 | 11/1997 |
| WO | 2005022109 A1 | 3/2005 |

OTHER PUBLICATIONS

Office Action from U.S. Appl. No. 12/253,028, dated Apr. 12, 2010.
Office Action from U.S. Appl. No. 12/253, 028, dated Jul. 30, 2010.
Office Action from U.S. Appl. No. 12/253,028, dated Nov. 5, 2010.
International Search Report PCT Application No. PCT/EP2007/003130, dated Oct. 2, 2007.
Crowder, James P., "Flow Visualization Techniques Applied to Full Scale Vehicles", 4th International Symposium on Flow Visualization, Paris, France, Aug. 27, 1986.
Thiel, E., "Anwendungsbeispiele herkommlicher Sichtbarmachungsmethoden aus dem Stromungsversuch bei Dornier", Interner Dornier Bericht, pp. 7-44, (1970-1975).
Maltby, "Flow Visualization in Wind Tunnels Using Indicators", AGARDograph 70, North Atlantic Treaty Organization Advisory Group for Aeronautical Research and Development, Royal Aircraft Establishment, Bedford, England, Apr. 1962.
Crowder, "Fluorescent Mini-Tufts for Non-Intrusive Flow Visualization", Hi-Lift System Aerodynamic Technology, Boeing Commercial Airplanes Co., Feb. 1977.
Dobney, et al., "The 'Mimituft' surface flow visualization method" Royal Aircraft Establishment, Apr. 1985.
Cremer, "Stromungssichtbarmachung mit Minitufts am Niedergeschwindigkeitskanal der THD", Studienarbeit, Fachgebiet Aerodynamik, pp. 1-75, Feb. 2, 1993.
Emmen, "Sichtbarmachung Der Stroemung Durch Mini-Tufts Fuer Windkanaele", Bericht FO-1753, Dec. 12, 1984.
Dobney et al., "The 'Minituft' surface flow visualisation method; experience of use in the RAE 5m pressurised low-speed wind tunnel", Aeronautical Journal, vol. 90, No. 891, pp. 10-17, Jan. 1986.
"Background Why Test in Wind Tunnels?", Wind Tunnel Experiments for Grades 8-12, (http://www.grc.nasa.gov/WWW/K-12/WindTunnel/WTExpKids/sId029.htm).
"Flow Visualization Techniques", Wind Tunnel Experiments for Grades 8-12, (http://www.grc.nasa.gov/WWW/K-12/WindTunnel/WTExpKids/sId019.htm).
"Flow Visualization Techniques", Wind Tunnel Experiments for Grades 8-12, (http://www.grc.nasa.gov/WWW/K-12/WindTunnel/WTExpKids/sId020.htm).
"Flow Visualization Techniques Yarn", Wind Tunnel Experiments for Grades 8-12, (http://www.grc.nasa.gov/WWW/K-12/WindTunne/WTExpKids/sId021.htm).
"Flow Visualization Techniques Illustrated", Wind Tunnel Experiments for Grades 8-12, (http://www.grc.nasa.gov/WWW/K-12/WindTunnel/WTExpKids/sId022.htm).
"Flow Visualization Techniques Cautions", Wind Tunnel Experiments for Grades 8-12, (http://www.grc.nasa.gov/WWW/K-12WindTunnel/WTExpKids/sId023.htm).
http:/www.epanorama.net/links/project-pc.html#pc-serial.html.
Nicks, "LowSpeed Wind Tunnel—Testing Systems", pp. 1-27, http://wind.tamu.edu/system.htm.
Worthey, "New Tunnels and Features in Website" The Wind Tunnel Connection, The Worthey Connection, vol. 1, Issue 1, pp. 1-5, Jul. 2000.

* cited by examiner countersunk notch for securely gripping of thread
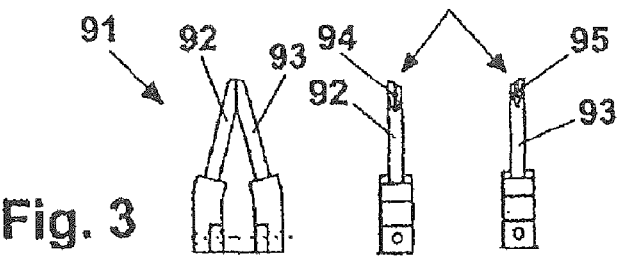
Fig. 3
side view
Fig. 3a   Fig. 3b
inside view
next to this frame a thread cutting device is attached to the table
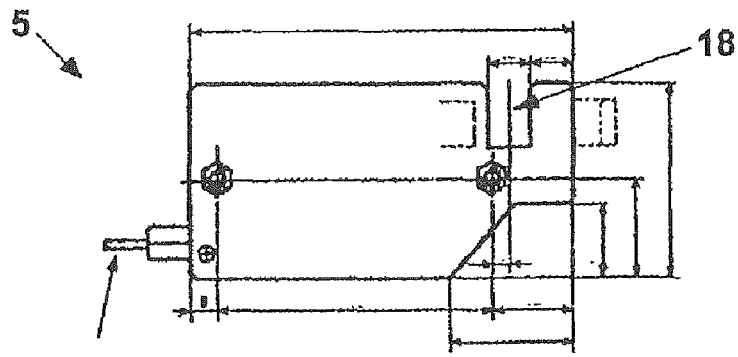
Fig. 4
side view
34 Volt connection
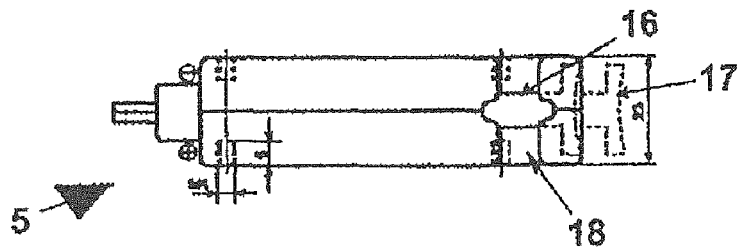
Fig. 4a
top view

APPARATUS AND METHOD FOR AUTOMATICALLY FABRICATING TAPE WITH THREADS FOR VISUALIZATION OF AIR STREAMS ON AERODYNAMIC SURFACES

CROSS-REFERENCE TO RELATED APPLICATIONS

The present application is a divisional of U.S. application Ser. No. 11/364,775, filed on Feb. 28, 2006, now U.S. Pat. No. 7,730,922, which is a continuation of PCT Patent Application Serial No. PCT/EP2004/009584, filed Aug. 27, 2004, claiming priority of German Patent Application Serial No. 103 40 259.4, filed Aug. 29, 2003, the disclosures of which are incorporated herein by reference in their entirety.

BACKGROUND OF THE INVENTION

The present invention relates to an apparatus and to a method for visualization of an air stream by means of threads on aerodynamic surfaces in such a way that strips of adhesive tape populated with threads are produced automatically.

There are various possibilities of visualizing air streams on model surfaces in wind channels. One technique is the application of threads (8) onto the surface to be examined. The behavior of the threads provides a quick overview over the air stream conditions in the examined region. By illumination with UV-light, white colored threads or fluorescent synthetic materials are visible very well, so that these measurements can be documented by means of a video camera. The threads are adhered to the model surface, either one by one by means of spots of adhesive material or by means of pieces of adhesive tape, or they are adhered to one side of adhesive tapes (24) before the adhesive tapes are attached to the model in the form of continuous strips. In the high velocity domain, the technique used is the one with individually affixed threads, since strips of adhesive tape (24) should not disturb the surface of the model. In the wind channel—LSWT Bremen of Airbus Deutschland GmbH measurements are performed in the low velocity domain. Therefore, preconfigured strips of adhesive tape (24) with threads may be used.

The following documents relate to the field of visualization methods for wind channel experiments. A method for performing such methods is not described. However, the cited documents point out the importance of visualization of streams with the help of threads on aerodynamic surfaces.

J. P. Crowder Flow simulation techniques 4th International Symposium on flow visualization Paris August 1986

E. Thiel Anwendungsbeispiele herkömmlicher Sichtbarmachungsmethoden aus dem Strömungsversuch bei Dornier Interner Dornier Bericht (1970-1975 ?)

Agardograph 70/April 1962

J. P. Crowder Fluorescent Mini Tufts for flow visualization Boeing Commercial Airplanes Co. February 1977 Royal aircraft establishment Techn. Memo AERO 2038

D. G. Dobney et al. The "Minituft" surface flow visualization method April 1985

Strömungssichtbarmachung mit Minitufts im Niedergeschwindigkeitskanal der THD Studienarbeit H. Cremer TH Darmstadt February 1993

Eidg. Flugzeugwerke Emmen Bericht FO 1753 Sichtbarmachung der Strömung durch Minitufts für Windkanäle 1984

SUMMARY OF THE INVENTION

Cutting of the Threads:

In the wind channel LSWT Bremen, mainly white threads or darning cotton are used for the visualization on the basis of threads. For cleaving or cutting of a single thread, the thread is wound around a cardboard strip from the thread roll; commercial darning cotton is already assembled on cardboard. The cotton is then cut together with the cardboard in order to obtain threads of a desired length (usually the length of the threads is about 2 cm, but should vary in length). For this, the cotton is fixed or clamped by means of an appropriate device, such that it can be neatly cleaved.

Preparation of the Strips of Adhesive Tape:

A plurality of one-sided sticky strips of adhesive tape, for example, commercial, one-sided sticky tape, which is as thin as possible, are fixed to a wooden mounting plate (21), sticky side up. Marking lines are arranged on the mounting plate (21) in order to provide standardized distances of the threads. The mounting plate (21) consists of wood which is approximately 1 meter long, which thus corresponds to the maximum length of the single strips of adhesive tape.

Application of the Thread:

The threads, which have previously been cut to the desired length, are then glued onto the prepared one-sided sticky strips of adhesive tape by hand. The threads should be glued on a length of 3-5 mm, such that a safe fixation of the threads on the strips of adhesive tape is assured.

The distance between the threads (8) may be changed if desired, otherwise the marking lines on the mounting plate (21) are used. The application of the strips of adhesive tape populated with the threads takes an employee several hours.

This work may be monotonous and time consuming but, on the other hand, has to be carried out on a daily scale in order to provide measurements with models in the wind channel.

Furthermore, there may be no apparatus today which automatically cuts threads, for example, to a length of 2 cm and then places them onto a sticky surface of a strip of adhesive tape. During adhesive bonding pressure has to be applied and the fingertips have to perform a rolling motion such that the threads are truly fixed to the surface of the strip of adhesive tape. Until today, this was unpleasant work for an employee of the wind channel team.

According to an exemplary embodiment of the present invention, an apparatus is provided, for fabrication of strips of adhesive tape populated with threads for the visualization of air streams that replaces the known cutting and applying of threads onto strips of adhesive tape.

This may provide for an exact fixation of the threads onto the strips of adhesive tape (24) with the possibility of producing little waste, such that the strips of adhesive tape (24) which are populated with the threads (8) have only to be applied onto the aerodynamic model surfaces to be examined.

Further exemplary embodiments and aspects of the inventive method and apparatus are set forth in the sub-claims.

In the following, the apparatus and the method are described with respect to the enclosed claims and with respect to FIGS. 1 to 10.

BRIEF DESCRIPTION OF THE DRAWINGS

FIG. 1A shows the robot coordinate system with corresponding axis labeling;

FIG. 3 shows a side view of tweezers with a counter-sunk groove for safe gripping and holding of the thread;

FIG. 3a shows an inside view of a left tweezer arm with a counter-sunk groove at the end of the arm;

FIG. 3b shows an inside view of a right tweezer arm with a counter-sunk groove at the end of the arm;

FIG. 4 shows a side view of a thread cutting unit;

FIG. 4a shows a top view of the thread cutting unit;

DETAILED DESCRIPTION

Figure 1:
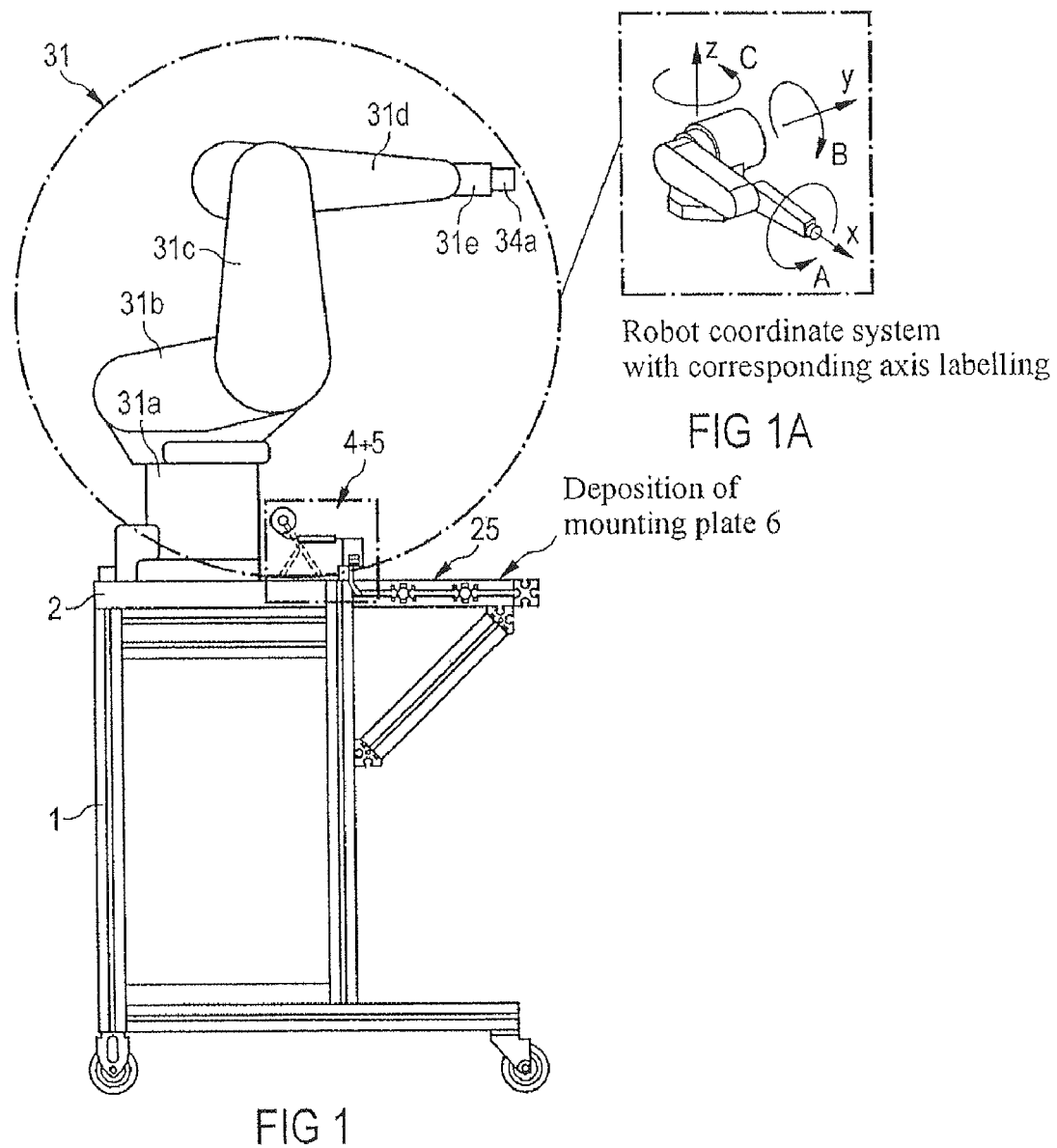
FIG. 1 shows the apparatus for the fabrication of strips of adhesive tape populated with threads for the visualization of air streams in a side view.

The apparatus, which is described in the following, is adapted to automatically glue threads onto strips of adhesive tap as explained in the following with respect to FIGS. 1 to 10.

Only a mounting plate (6), which comprises sticky strips of adhesive tape which are all fixed at the same location, may have to be prepared (work time approximately 5 minutes). A robot of a small weight class is used, for example, a robot of the 3 kilogram weight class. The robot is fixedly mounted on a frame (1) which is fixed to the ground or standing on the ground. Furthermore, the thread exit unit (4) and the thread cutting unit (5) are mounted on the frame (1), which is fixed to the ground, in the operational range of the robot. A mounting plate (6) which consists of Plexiglas and which comprises a one-sided sticking strip of adhesive tape is put in the operational range of the robot. The mounting plate (6) is put into a frame (front part of the frame (1) which is fixed to the ground).

The frame (25) is provided with bars, which are cushioned with a 1 cm thick mat of foamed plastic.

Thus, the same position of the mounting plate (6), in relation to the fixed robot, may always be provided and the system may obtain a certain amount of flexibility due to the mat of foamed plastic which is positioned under the plate.

The robot which is fixedly mounted on the back section of the frame (1), is according to an exemplary embodiment of the present invention, equipped in such a way that a pneumatic gripper (9) is mounted on the robot flange by means of a gripper flange connecting unit, wherein tweezers (91), for example, consisting of aluminum, are mounted on the jaws of the gripper (9) at the mounting point (see FIG. 3).

Figure 2:
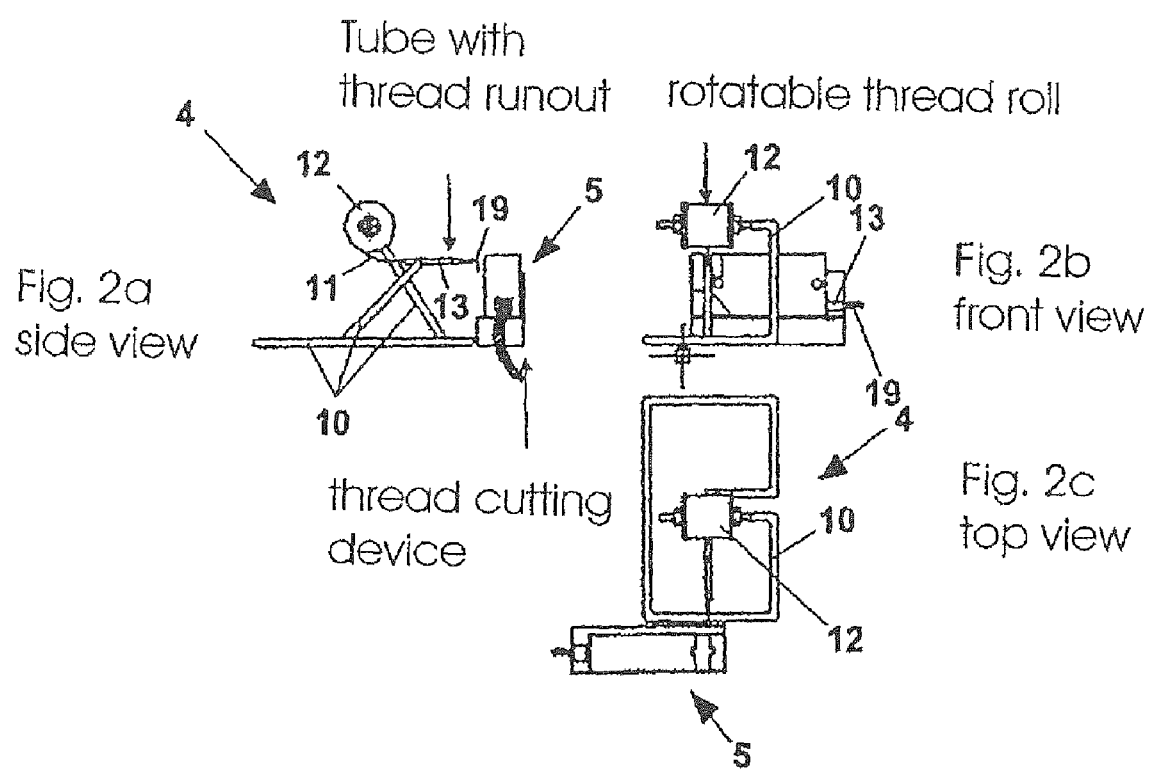
FIG. 2a shows the side view of a thread access unit next to a thread cutting unit (which is framed by a dashed line in FIG. 1)
FIG. 2b shows a front view of the thread exit unit next to the thread cutting unit.
FIG. 2c shows a top view of the thread exit unit next to the thread cutting unit.

A thread access unit (4) is, according to an exemplary embodiment of the present invention, designed in such a way that a thread roll (12) is rotatably mounted in a small frame, wherein the beginning of the thread runs through a small tube and then exits out of the tip of the tube (13) for gripping (see FIG. 2).

The thread access unit is positioned in such a way, that it is accessible by the gripping unit of the robot.

Next to the thread access unit (4) is the thread cutting unit (5), attached to the frame (1).

An advantage of the present invention may be that the threads do not have to be cut to a defined length manually anymore.

The operating voltage of the thread cutting unit (5) is 24 volts DC (20 volts . . . 36 volts DC).

The current consumption of the thread cutting unit (5) is 200 m amps (at 24 volts DC).

Reaction time: 20 ms.

Range of application: Up to 3000 dtex.

FIG. 4 shows a side view of a thread cutting unit and FIG. 4a shows a top view of a thread cutting unit. The thread cutting unit (5) is fixedly mounted to the back section of the model (1) which is fixed to the ground, in front of the frame (22) with thread roll (12), such that the end of the unwound thread (11) hangs out of the middle tube (13) of the frame, and is positioned directly in front of the entrance of the plane of the knives of the thread cutting unit (5).

The thread cutting unit (5) is a commercially available electric thread cutting apparatus with a thread clamp, which is mainly used for automated sewing machines. The thread cutting unit (5) cuts a little thread (11) by applying a voltage of 24 volts (200 mA).

A knife (16), which is biased by the force of a spring, hits an anvil, which is positioned opposite, thus cutting the little thread (11), which is positioned in slit (18) and then holds the cut thread by means of a thread clamp. The little thread (11) is held tight until the spring is again biased by means of a manually applied force, which is applied to the reset means (17).

The sequential procedure is carried out such that a mounting plate (6) is put into a frame (25) (front part of the frame (1)) in front of the robot in its operational range, wherein one-sided sticky strips of adhesive tape are always fixed at the same location (along the marking lines). Thus, always the same position in relation to the fixed robot is provided and the system obtains some flexibility due to the mat of foamed plastic which is positioned below the plate.

The robot is programmed in such a way that it grabs the threads of the thread roll (12) of the frame (22) which hangs from the little tube (13) with the gripper (9) or grabber (9) by means of the tweezers (91), and then pulls the thread (11) along a length of 2 cm in horizontal direction over the slit (18) of the thread cutting unit (5). While the tweezers (91) are still holding the thread (11), a relay is switched by means of the robot control, which firstly triggers a cutting of the thread (11) and then opens the clamping device of the thread unit (5). In the next step, the robot positions the tweezers (91), which are still gripping the little thread, over the mounting plate (6) in such a way that the tweezers (91) can be opened and the little thread folds onto the desired position of the strip of adhesive tape.

At the position (Y access and X access unchanged), at which the little thread has been dropped, the robot rotates the gripping unit in the next step in such a way that the spring-mounted pressing means (27), which is mounted on the flange of the robot (access 6) too, carries out a vertical movement towards the mounting plate (6) and fixes the little thread onto the sticky surface of the strip of adhesive tape by means of the spring mounting pressing means (27).

The procedures of fetching the little thread (11), cutting the little thread (11), putting down the little thread, pressing on the little thread are repeated by respectively programming the robot until the strips of adhesive tape, which are fixed to the mounting plate (6), are populated with little threads in a defined distance.

Figure 5:
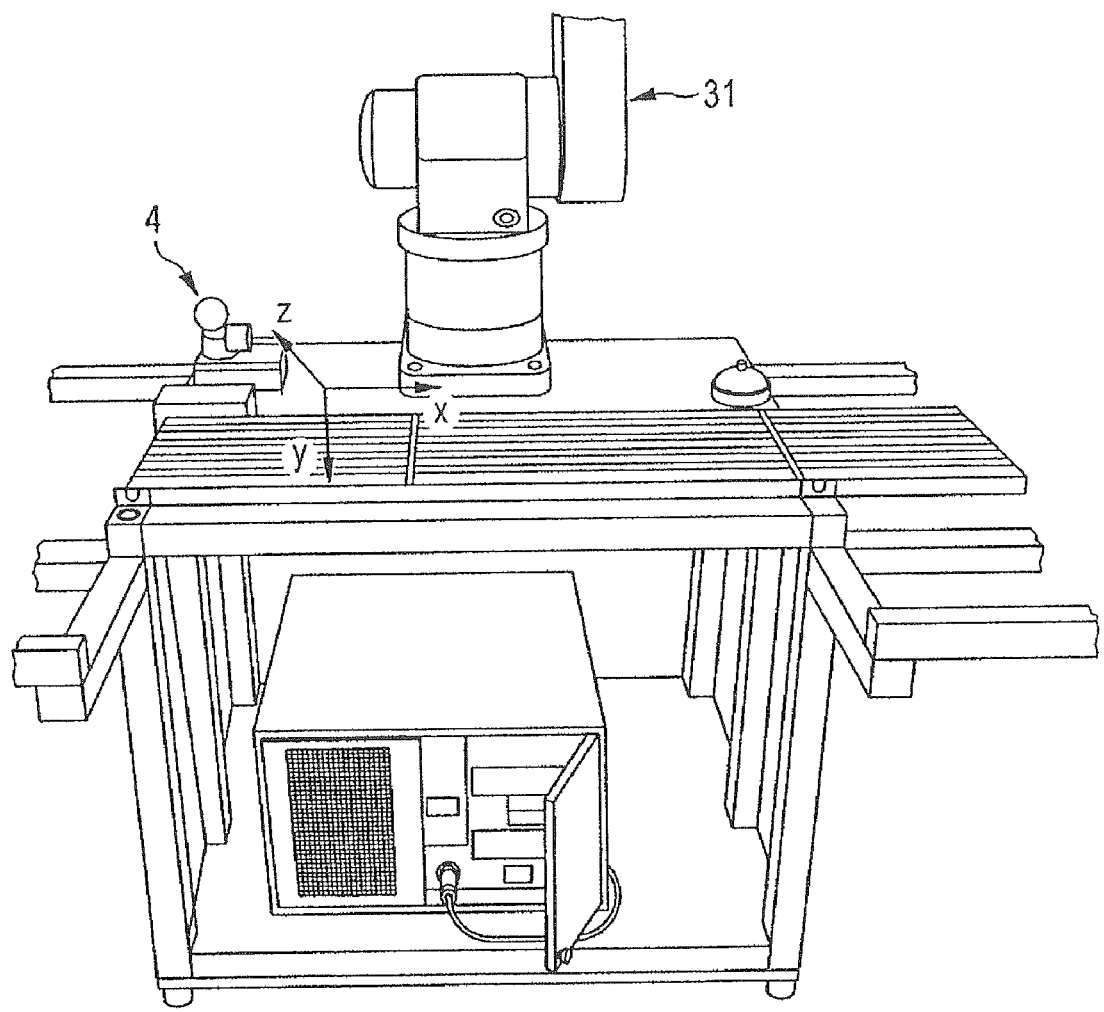
FIG. 5 shows the set-up of the apparatus.
Figure 6:
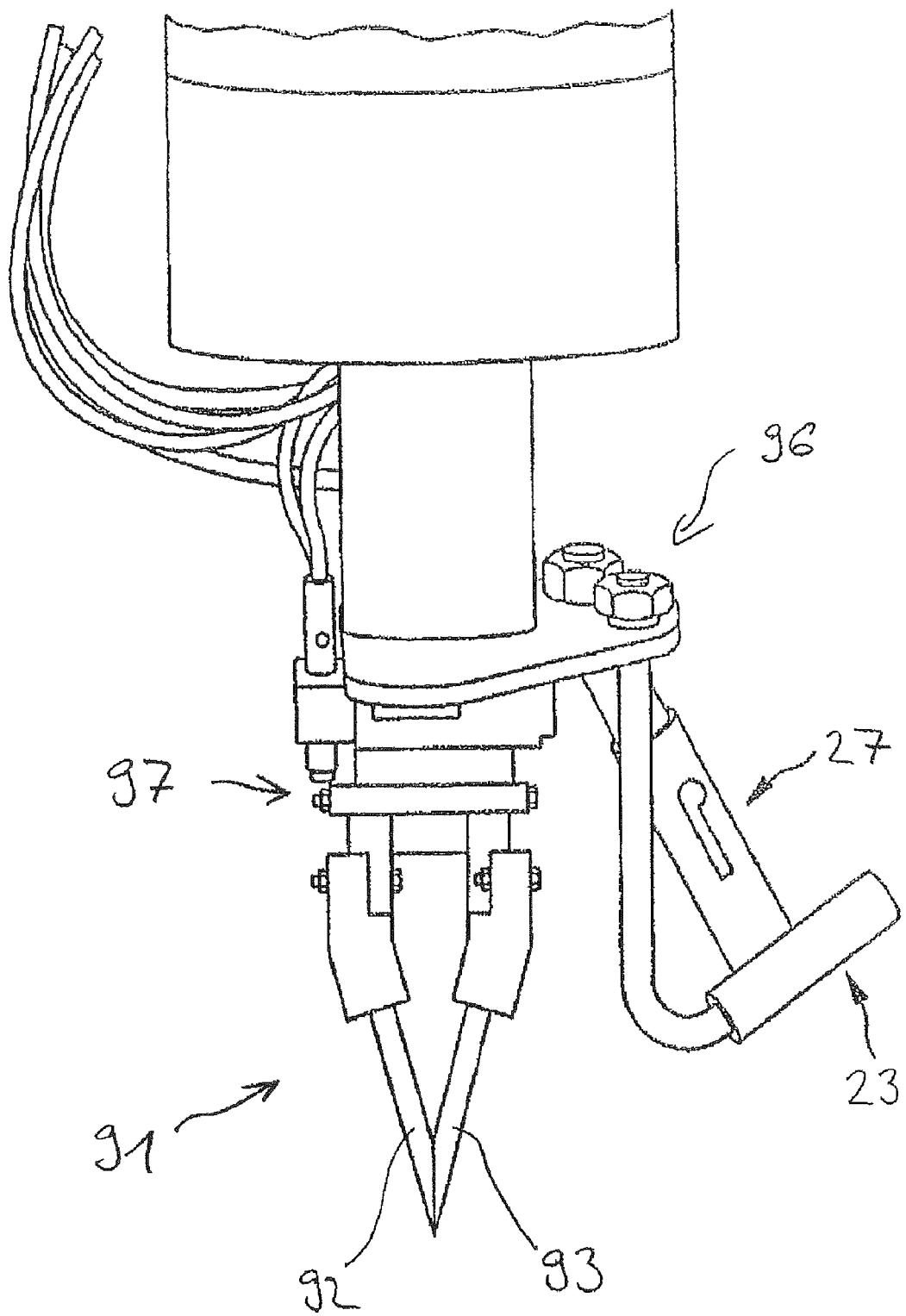
FIG. 6 shows tweezers/connection unit of gripper flange with metal finger and pressing means.

FIG. 5 shows the set-up of the whole apparatus.

Since the mounting plate (6) may be so wide that it cannot be reached completely by the access of the robot, a metal finger (23) may be mounted on the connecting unit of the gripper flange, which moves the mounting plate (6) along a horizontal movement (movement in the direction of the negative X-access) in the frame of the ground-fixed frame (1) by means of a movement of the access of the robot to such an extent that the robot is put in a position to drop further little threads onto the mounting plate (6) and fix them. This can be seen in FIG. 6.

Figure 7:
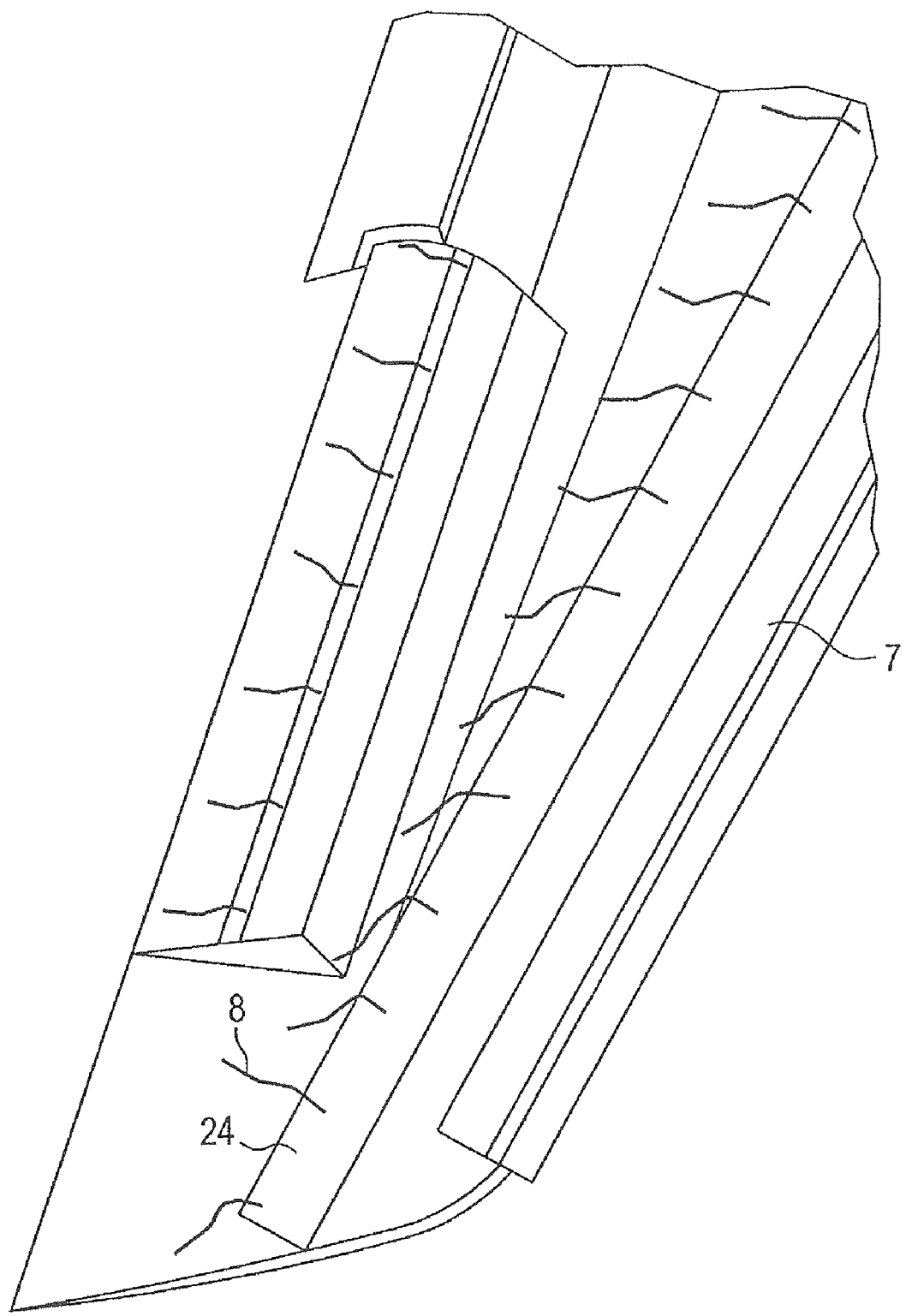
FIG. 7 shows a partial view of a model wing with strips of adhesive tape applied.
Figure 8:
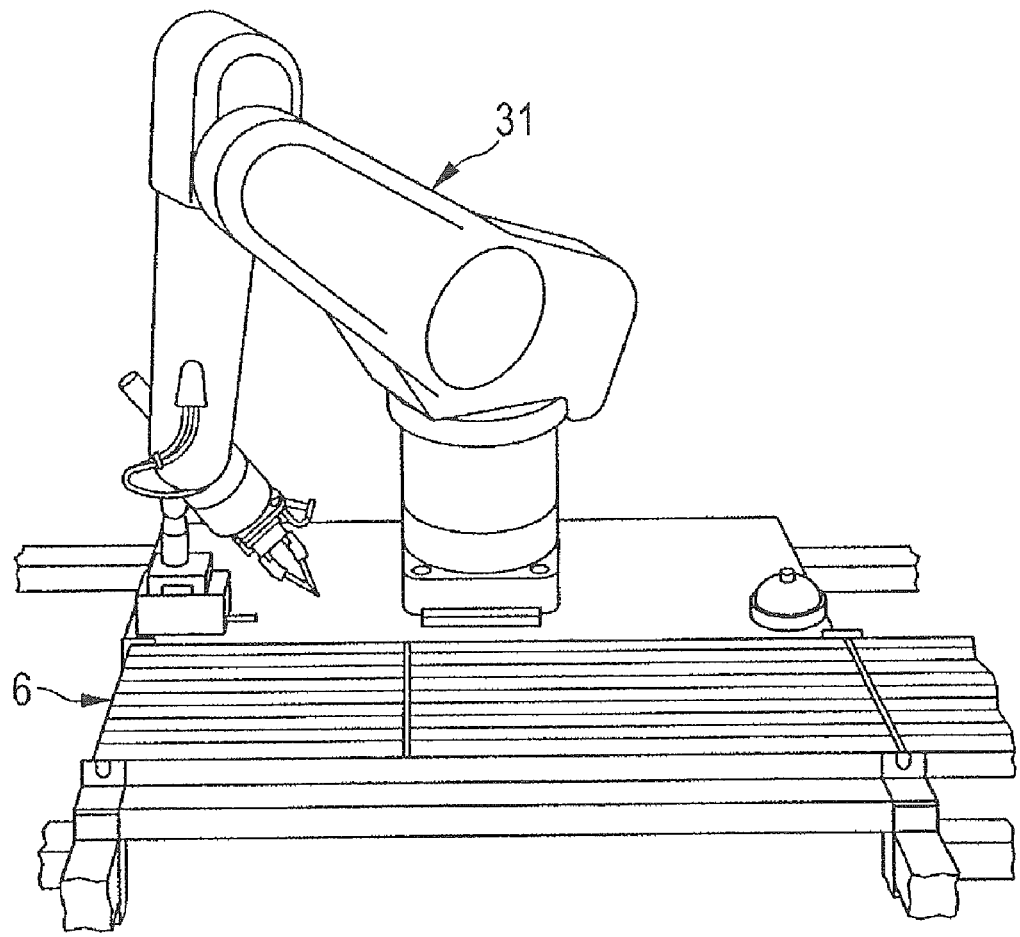
FIG. 8 shows a partial view of a mounting plate of Plexiglas located in the working-area of the robot.
Figure 9:
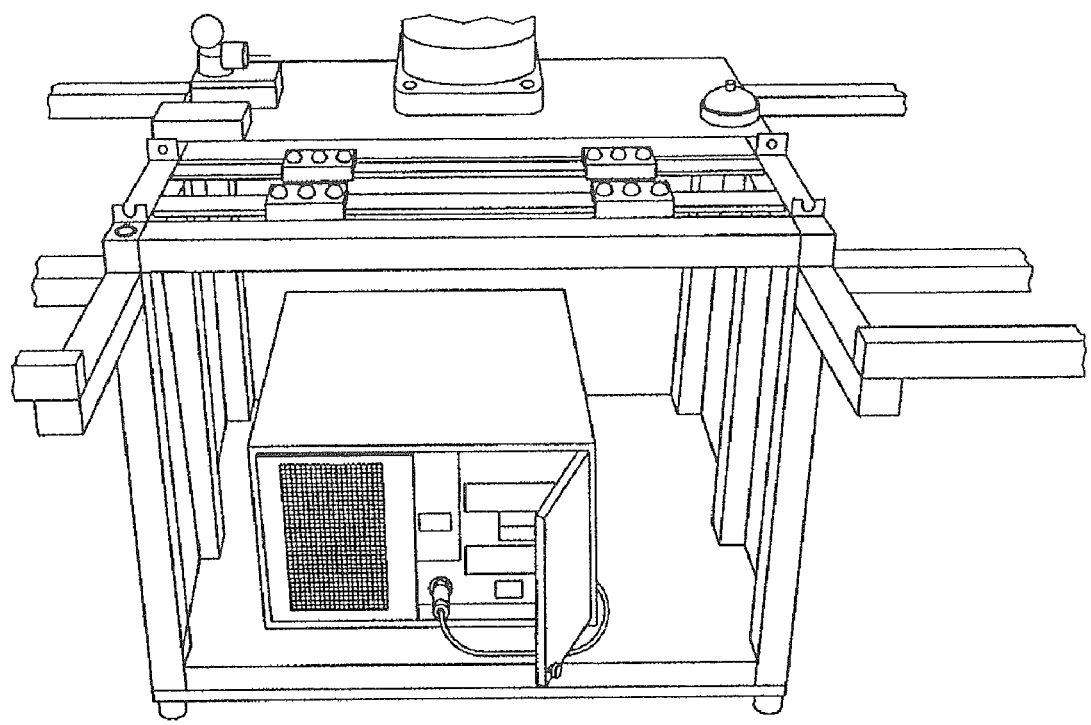
FIG. 9 shows a partial view of a base frame with front frame for the base plate.
Figure 10:
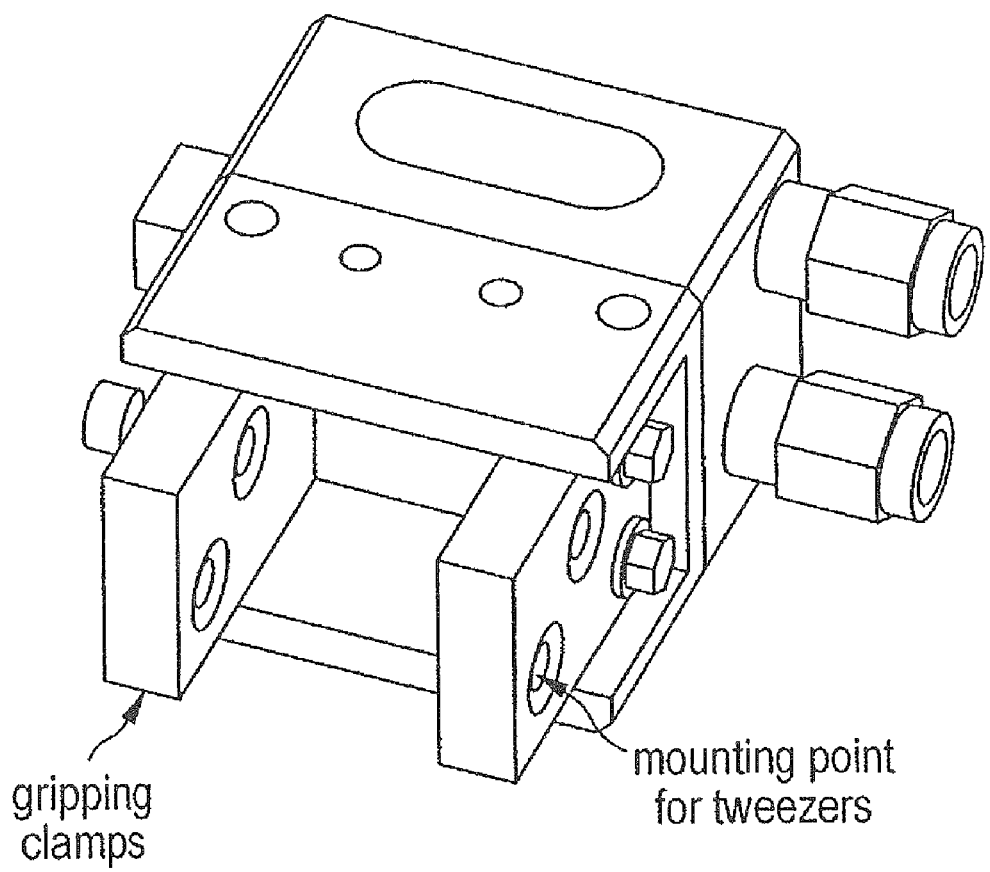
FIG. 10 shows a gripper (9).

FIG. 7 shows a partial view of a model wing (7) with strips of adhesive tape (24) with threads (8) adhered thereto;

FIG. 8 shows a partial view of a mounting plate (6) of Plexiglas located in the working-area of the robot (31);

FIG. 9 shows a partial view of a base frame with front frame for the base plate;

FIG. 10 shows a gripper (9).

According to an exemplary embodiment of the present invention, any programmable robot may be used for setting up the experiment.

The use of the apparatus may result in saving several hours of time per day, since the apparatus may be operated at the same time measurements are performed, without the need of manpower.

This may be the first automated apparatus for the adhesion of little threads, which is of major interest for worldwide wind channels working in a low velocity mode, suppliers of wind channel models and the Formula 1 (wind channel of Toyota).

The present invention relates to an apparatus and a method for fabrication of strips of adhesive tape populated with little threads on a mounting plate for the visualization of air streams. The positioning of threads on strips of adhesive tape is automated, whereby laborious fixing by hand of little threads in huge amounts onto aerodynamic surfaces in a wind channel, which visualize the air streams during a test, does not have to be applied any longer.

The apparatus for fabrication of strip of adhesive tape populated with little threads on a mounting plate consists of a base frame fixed to the ground on which a frame plate is mounted at a vertical distance to the footprint of the frame and horizontally arranged. A Robot unit, a thread access unit, a thread cutting unit and a mounting plate are arranged on the frame plate, wherein a plurality of threads are arranged on the surface according to a predetermined deposition arrangement on the mounting plate. The robot unit comprises control means, which transmit movement instructions to the robot access. The robot (manipulator) and the thread access unit, as well as the thread cutting unit, are fixedly arranged on a first plate section of the frame plate. The mounting plate is mounted on a second plate section of the frame plate, which is located next to the first plate section, wherein the mounting plate is exchangeable and un-moveable. The robot unit and the thread access unit, the thread cutting unit, the mounting plate are successively arranged in a first horizontal position direction. Due to the arrangement and design of the robot arms and the maximum movement, the accessibility of thread access unit and the thread cutting unit, as well as the base plate populated with a plurality of threads, is endured.

In the present method is for fabricating strips of adhesive tape populated with little threads for the visualization of air streams. The threads are detached from the mounting plate and then fixed to a surface of a model, which will be exposed to a wind channel, on which model surface, which will be then passed by an air stream.

In the present method, a plurality of short threads are arranged at defined distances onto the strips of adhesive tape and distributed thereon, which is realized by the apparatus described above.

In the apparatus, a horizontally arranged robot unit, a thread access unit and a thread cutting unit are positioned on the frame plate and the mounting plate is pre-processed for the fixation of the strips of adhesive tape at an earlier point in time with strips of adhesive tape positioned on the mounting plate according to a defined drop down architecture and with attaching the strips of adhesive tape at sides of edges of the mounting plate.

In one embodiment, the method comprises the following further steps, according to which the robot unit is programmed, such that the robot unit transmits control commands to a plurality of robot arms and to different units, which are installed on the frame plate:

a) firstly a pivot movement is executed by the robot hand with the tweezers, such that the tip of the tweezers is directed in front of the tube of the thread access unit, b) then the pivotably mounted and oppositely arranged addressable tweezer arms of tweezers, which are exchangeably mounted to the gripper of the robot hand, and a thread, which is unwound from a thread roll which is fixed to the frame and rotatably mounted, and which is then guided through a horizontally arranged thread tube and hangs down from the thread tube outwardly, wherein the tweezer arms grab the thread and then pull it with defined thread length, c) furthermore, the robot hand which grabs the thread with the tweezer arms, performs a pivot movement across the free space of the thread cutting unit, which then d) puts down an end section of a thread which is craned and located at the end of the thread of the unwound thread into the free space between opposite knife edge and anvil of the thread cutting unit, and which then e) impresses the caliper of the thread cutting unit due to a received robot movement command with the metal finger and triggers the following cutting of the craned end section of thread to a defined length, wherein the thread cutting unit holds the cut end section of the thread after it has been cut, after which f) the robot hand performs a further pivot movement and positions the tweezers which grab the thread over the mounting plate which is prepared with a plurality of strips of adhesive tape, after which g) the arms of the tweezers are opened at a short vertical distance above a pre-defined location on the corresponding strip of adhesive tape, which will then drop off a short thread above this predefined location onto the respective strip of a adhesive tape, then h) the arms of the tweezers are closed and then i) the spring-mounted pressing means, which is mounted on the connection means of the gripping flange, moves in a rotating vertical movement such that the short thread is pressed on the predefined position by a short press of the spring-mounted pressing means, after which j) the robot hand departs together with the populated tweezers from the pre-prepared mounting plate by performing a vertical movement of the robot hand and thereon k) the steps a) to j) are repeated until a respective short thread has been pressed on all predefined positions on all fixed strips of adhesive according to a preprogrammed defined deposition architecture.

In the present method, a foamed plastic underlay may be arranged under the preprocessed mounting plate on the frame of the base frame, in order to avoid damage of the gripping unit during pressing application.

In a specific embodiment, the arms of the tweezers form a closed press on area, by which the short thread of the step i) is at first safely held at the predefined location and then dropped at a defined location by opening the arms of the tweezers without jamming (getting caught), and is fixed with a minimal rolling movement of the robot arm by a vertical movement of the spring-mounted pressing means consisting of Teflon®.

What is claimed is:

1. A method of fabricating strips of adhesive tape populated with little threads for the visualization of air streams, the threads being detached from the mounting plate and then fixed to a surface of a model, which will be exposed to a wind channel, on which model surface, which will be then passed by an air stream, a plurality of short threads are arranged at defined distances onto the strips of adhesive tape and distributed thereon, which is realized by an apparatus for fabricating adhesive tape with threads for visualization of air streams on aerodynamic surfaces, the apparatus comprising:

a fixed frame, a frame plate mounted on the fixed frame, a mounting plate, a programmable robot unit, a thread access unit and a thread cutting unit;

wherein the frame plate comprises a first and a second section, the first and second sections being adjacent to one another;

wherein the programmable robot unit comprises a robot base frame, a robot carousel that is rotatably mounted on the robot base frame, a robot rocker, a robot arm and a robot hand;

wherein the robot base frame, the thread access unit and the thread cutting unit are fixedly arranged on the first section of the frame plate;

wherein the mounting plate is mounted on the second section of the frame plate so as to be detachable, but unmovable when attached to the frame plate;

wherein the programmable robot unit, the thread access unit, the thread cutting unit and the mounting plate are arranged successively in a horizontal position so as to allow access of the robot arm to the thread access unit, the thread cutting unit and the mounting plate; and wherein the programmable robot unit is programmed to:

a) grasp an end of unwound thread hanging from a thread tube of the thread access unit and pull the unwound thread to a predetermined thread length;

b) place the end of the unwound thread over the thread cutting unit;

c) activate the thread cutting unit to cut the unwound thread into a thread of defined length;

d) place the thread of defined length over a strip of adhesive tape on the mounting plate, such that an end section of the thread of defined length is aligned substantially orthogonal to a longitudinal direction of the strip, such that a remaining section of the thread of defined length protrudes over a first longitudinal border of the strip, and such that the end section of the thread of defined length does not reach a second longitudinal border of the strip opposite to the first longitudinal border; and e) press the end section of the thread of defined length into the strip of adhesive tape;

wherein the horizontally arranged robot unit, the thread access unit and the thread cutting unit are positioned on the frame plate and the mounting plate is pre-processed for the fixation of the strips of adhesive tape at an earlier point in time with strips of adhesive tape positioned on the mounting plate according to a defined drop down architecture and with attaching the strips of adhesive tape at sides of edges of the mounting plate, the method comprising the further steps, according to which the robot unit is programmed, such that the robot unit transmits control commands to a plurality of robot arms and to different units, which are installed on the frame plate:

a) executing a pivot movement by the robot hand with tweezers, such that the tip of the tweezers is directed in front of the tube of the thread access unit, b) grabbing with the pivotably mounted and oppositely arranged addressable tweezer arms of the tweezers, which are exchangeably mounted to a gripper of the robot hand, a thread, which is unwound from a thread roll which is fixed to the frame and rotatably mounted, and which is then guided through a horizontally arranged thread tube and hangs down from the thread tube outwardly, and pulling the thread to a defined thread length, c) performing a pivot movement across the free space of the thread cutting unit with the robot hand which grabs the thread with the tweezer arms, d) putting down an end section of a thread which is craned and located at the end of the thread of the unwound thread into the free space between opposite knife edge and anvil of the thread cutting unit, e) impressing a caliper of the thread cutting unit due to a received robot movement command with a metal finger and triggering the following cutting of the craned end section of thread to a defined length, wherein the thread cutting unit holds the cut end section of the thread after it has been cut, f) performing with the robot hand a further pivot movement and positioning the tweezers which grab the thread over the mounting plate which is prepared with a plurality of strips of adhesive tape, g) opening the arms of the tweezers at a short vertical distance above a pre-defined location on the corresponding strip of adhesive tape, which will then drop off a short thread above this predefined location onto the respective strip of a adhesive tape, h) closing the arms of the tweezers, i) moving a spring-mounted pressing means, which is mounted on the connection means of the gripper, in a rotating vertical movement such that the short thread is pressed on the predefined position by a short press of the spring-mounted pressing means, j) departing the robot hand together with the populated tweezers from the pre-prepared mounting plate by performing a vertical movement of the robot hand, and k) repeating steps a) to j) until a respective short thread has been pressed on all predefined positions on all fixed strips of adhesive according to a preprogrammed defined deposition architecture.

2. The method of claim 1, wherein a foamed plastic underlay is arranged under the pre-processed mounting plate on the frame of the base frame, in order to avoid damage of the gripper during pressing application.

3. The method of claim 1, wherein the arms of the tweezers form a closed press on area, by which the short thread of the step i) is at first safely held at the pre-defined location and then dropped at a defined location by opening the arms of the tweezers without jamming, and the short thread is fixed with a minimal rolling movement of the robot arm by a vertical movement of the spring-mounted pressing means consisting of Teflon®.

4. A method of fabricating adhesive tape with threads for visualization of air streams on aerodynamic surfaces with an apparatus for fabricating adhesive tape with threads for visualization of air streams on aerodynamic surfaces, the apparatus comprising:

a fixed frame, a frame plate mounted on the fixed frame, a mounting plate, a programmable robot unit, a thread access unit and a thread cutting unit;

wherein the frame plate comprises a first and a second section, the first and second sections being adjacent to one another;

wherein the programmable robot unit comprises a robot base frame, a robot carousel that is rotatably mounted on the robot base frame, a robot rocker, a robot arm and a robot hand;

wherein the robot base frame, the thread access unit and the thread cutting unit are fixedly arranged on the first section of the frame plate;

wherein the mounting plate is mounted on the second section of the frame plate so as to be detachable, but unmovable when attached to the frame plate;

wherein the programmable robot unit, the thread access unit, the thread cutting unit and the mounting plate are arranged successively in a horizontal position so as to allow access of the robot arm to the thread access unit, the thread cutting unit and the mounting plate; and wherein the programmable robot unit is programmed to:
a) grasp an end of unwound thread hanging from a thread tube of the thread access unit and pull the unwound thread to a predetermined thread length;
b) place the end of the unwound thread over the thread cutting unit;
c) activate the thread cutting unit to cut the unwound thread into a thread of defined length;
d) place the thread of defined length over a strip of adhesive tape on the mounting plate, such that an end section of the thread of defined length is aligned substantially orthogonal to a longitudinal direction of the strip, such that a remaining section of the thread of defined length protrudes over a first longitudinal border of the strip, and such that the end section of the thread of defined length does not reach a second longitudinal border of the strip opposite to the first longitudinal border; and
e) press the end section of the thread of defined length into the strip of adhesive tape, the method comprising the following steps:

a) grasping one end of unwound thread hanging from a thread tube of the thread access unit and pulling the thread to a predetermined thread length;
b) putting the one end into the thread cutting unit;
c) activating the thread cutting unit to cut the thread into a section of thread with a defined length;
d) placing the cut section of thread over an adhesive tape on the mounting plate;
e) pressing the cut section of short thread into the adhesive tape.

5. The method of claim 4, wherein a foamed plastic underlay is arranged under the mounting plate on the frame of the base frame, in order to avoid damage of a gripper during pressing application.

6. The method of claim 4, wherein arms of tweezers form a closed press on area, by which the short thread of the step e) is at first safely held at a pre-defined location and then dropped at a defined location by opening the arms of the tweezers without jamming ,and the short thread is fixed with a minimal rolling movement of the robot arm by a vertical movement of a spring-mounted pressing means consisting of Teflon®.

* * * * *

UNITED STATES PATENT AND TRADEMARK OFFICE
CERTIFICATE OF CORRECTION

PATENT NO. : 8,034,210 B2
APPLICATION NO. : 12/794189
DATED : October 11, 2011
INVENTOR(S) : Eva Marie Montilla Mendez, Susanne Wyrembek and Tim Mönnig It is certified that error appears in the above-identified patent and that said Letters Patent is hereby corrected as shown below:

Title Page, under (75) Inventors, "Moenning" should read --Mönnig--.

Signed and Sealed this
Seventh Day of May, 2013

Teresa Stanek Rea
*Acting Director of the United States Patent and Trademark Office*